June 3, 1941. L. EMANUELI 2,244,392
DEVICE FOR SUPERVISING THE PRESSURE IN FLUID FILLED CABLES
Filed April 26, 1939
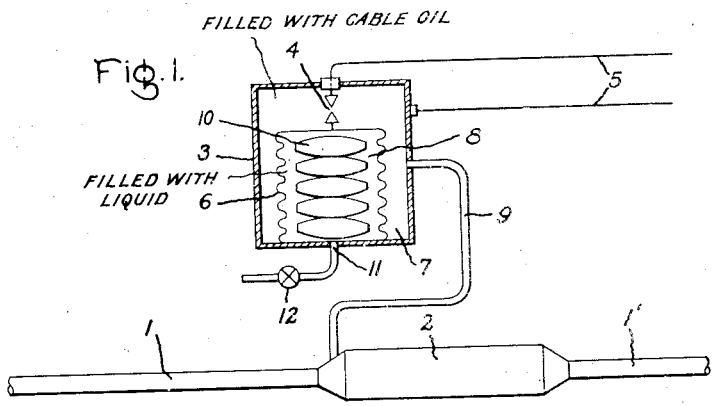
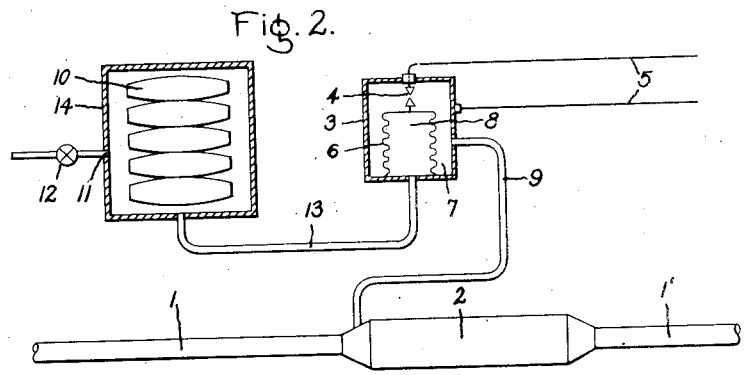
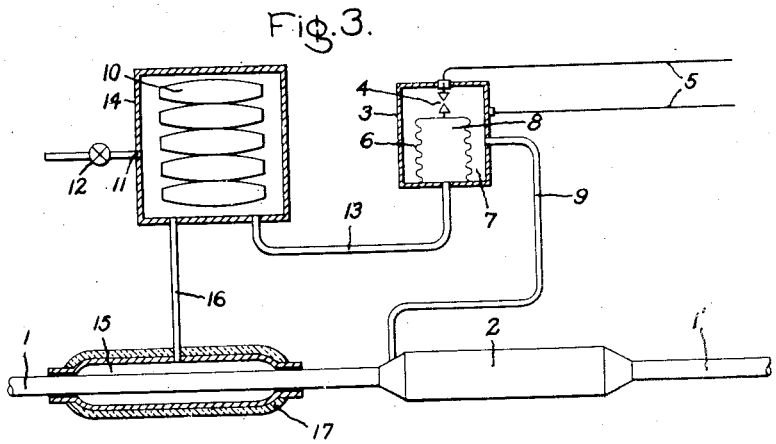
Inventor:
Luigi Emanueli,
by Harry E. Dunham
His Attorney.

Patented June 3, 1941

2,244,392

UNITED STATES PATENT OFFICE 2,244,392

DEVICE FOR SUPERVISING THE PRESSURE IN FLUID FILLED CABLES

Luigi Emanueli, Milan, Italy, assignor to Società Italiana Pirelli, a corporation of Italy Application April 26, 1939, Serial No. 270,258
In Italy June 13, 1938

9 Claims. (Cl. 177—311)

The present invention refers to installations of fluid-filled cables, that is cables containing a liquid dielectric which with a rise of temperature expands and is collected in suitable reservoirs, and with a drop of temperature flows back into the cable, so that a certain pressure is always present in the cable and the formation of empty spaces or voids is prevented. The reservoirs generally consist of hermetically sealed casings filled with liquid and communicating with the inside of the cable, in which casing there are closed collapsible cells filled with gas. The pressure in these reservoirs increases with the volume of liquid contained therein.

The pressure existing inside a cable supplied with reservoirs of the type described above, dependent upon the temperature of the cable itself, is subjected to variations due either to load or to climatic conditions; it is at its maximum during the summer and when the cable is at full load, and at its minimum during the winter and when there is no current in the cable. Abnormal pressures may however occur which are lower than these minimum values, when there is a loss of the insulating liquid of the cable at some points of its length due to the lead sheath breaking or of its length due to the lead sheath breaking or through faults in the tightness of the joints or other accessories. It is essential that these abnormal pressure drops be quickly noticed, so that the necessary repairs can be made before the reservoirs become completely empty. It is for this purpose that apparatus which will signal any abnormal pressure values which may occur have been devised.

The apparatus for supervising the pressure in cables filled with liquid dielectric, such as degasified oil, forming the object of the present invention has special advantages when compared with those already known.

It has previously been proposed to connect at determined points along the line the oil of the cable with manometers provided with an electric contact capable of signalling at a distance as at a central station when the oil pressure of the cable has reached a determined value, for example when it has reached a prefixed minimum level. As already known a contact manometer suitable for this purpose is constituted by a closed vessel in communication with the cable and filled with oil, in which a closed cell having collapsible walls filled with gas is immersed, the electric contact being operated by the variation of the volume, particularly by the expansion of the cell. By initially adjusting the gas pressure in the cell opportunely, by introducing or extracting gas through a closable tube which protrudes out of the manometer, the electric contact can be made to operate in correspondence with the pressure value to be signalled.

This device however presents serious difficulties in practice. First of all the regulation of the manometer in the way described above is a delicate operation, as it involves manipulation of a small quantity of gas. Furthermore the conservation of the gas inside the cell is also difficult, as the tightness of the walls and of the tube connected to it used in regulating the gas supply, may gradually become defective, which defect in the tightness, for instance the tube used in regulating the gas supply, may in time become sufficiently injured as to render the apparatus incapable of operation, and there is the added danger that there will be no outside evidence of this.

Another trouble, just as serious, is that in practice a pressure slightly lower than the minimum pressure existing in the cable during the winter and with no load thereon has to be chosen for the signalling pressure. If, however, a loss of oil should then occur in the cable during the summer and with load, that is when the pressure is high, the signal may be given only when the pressure is greatly decreased, and consequently when a considerable amount of oil has leaked out, which will put the cable in danger. It is not easy to provide against these troubles in practice by renewing or varying the regulation of the manometer from time to time for instance at the change of the seasons, for, apart from the delicacy of the operation, the work has to be done on apparatus which necessarily are hermetically enclosed in protective casings, which in turn are buried underground or are situated in manholes which are often full of water and mud.

The improved apparatus forming the subject of the present invention avoids these difficulties. It comprises in the first place a manometric system which compares the oil pressure in the cable with that of a mass of liquid contained in a closed system containing collapsible cells filled with gas, the mass or body of liquid in the closed system being at all times separately maintained from the oil in the cable. This apparatus is provided in any of the known ways with electric contacts to cause a signal to begin at a distant point when determined pressure conditions occur. It may, in practice, be so arranged that a contact acts when the pressure drops below a pre-established minimum value. In order to regulate, when necessary, the pressure inside the system, that is to fix the operating pressure of the electric contact at will, the closed system containing the liquid is supplied with a closable opening through which it is possible to draw off or pour in liquid. The regulation by means of a liquid clearly has considerable practical advantages compared with the regulation by means of a gas, as used in the apparatus so far known.

Furthermore, in this device the means of rendering the pressure of the liquid in the closed system automatically variable with the temperature of the cable can also be provided for, so that the operating pressure of the contact follows the climatic changes and the fluctuations of the load. To obtain this it can be so arranged that at least part of the liquid contained in the closed system has a temperature depending upon that of the cable, for instance being in a chamber forming part of the closed system and in good thermal communication with the cable.

An object of my invention is an improved arrangement of parts whereby upon a predetermined change of pressure conditions within a fluid-filled cable, modified by changes in climatic conditions, is caused to actuate a suitable signal.

A further object of my invention is an improved method of supervising the operation of a fluid-filled cable.

For a consideration of what I believe to be novel and my invention, attention is directed to the accompanying description and the claims appended thereto.

The attached drawing serves to illustrate the present invention, Figs. 1, 2 and 3 representing as examples some executive forms thereof.

In each of these figures, 1 and 1' are two lengths of cable filled with liquid dielectric, such as degasified oil, and connected through the joint 2. 3 is the manometric apparatus fitted with the contact 4 connected to the signalling line 5 extending to a station located at some selected point. The interior of the apparatus or vessel is divided into two compartments or chambers 7 and 8 by a collapsible wall 6 made in the form of a bellows diaphragm. While the compartment 7 is full of oil communicating with the cable by means of a tube 9, compartment 8 forms part of a closed system filled with an independent liquid which is separately maintained from that in the cable. 10 indicates collapsible cells or elements, each of which is closed and full of gas, and 11 the opening existing in the closed system which may be closed for instance by a valve 12, through which opening liquid can be drawn off or poured in to regulate the operating pressure of the bellows diaphragm and the contact actuated thereby. The liquids in the vessel and in the closed system act differentially on the means for actuating the circuit controlling means of the signal system. The cells or expansible and contractible elements are submerged in the liquid contained in the bellows diaphragm.

In the executive form shown in Fig. 1 the closed system filled with what for the purposes hereof may be termed independent liquid is constituted only by the compartment or chamber 8 of the bellows diaphragm in which the cells 10 full of gas are contained.

In the executive form shown in Fig. 2 the closed system filled with liquid is constituted by the compartment or chamber 8 of the manometric apparatus and by the vessel 14 connected to it by means of the tube 13; the cells full of gas are contained in this vessel.

In the executive form shown in Fig. 3 the chamber 15 also forms part of the closed system, it being filled with the same liquid and communicating with the vessel 14 by means of the tube 16. The chamber 15 surrounds a suitable length of cable. The liquid in the chamber is in direct contact with the cable lead or sheath and closely follows its temperature as it oscillates. The consequent variations of volume of the liquid in the chamber 15 in this way serve to modify the operating pressure of the manometer contact in conformity with the climatic changes and with the fluctuations of the cable load. It is advisable for this purpose that the walls of the chamber 15 be externally covered with a thermal insulation 17.

The above-mentioned advantage is obtained, according to the present invention, by means of organs applied only to the cable to be supervised, without using other cables of the same line, as is done with other devices so far known.

What I claim as new and desire to secure by Letters Patent of the United States, is:

1. A cable system comprising a cable filled with liquid under pressure, a vessel in free communication with the cable and filled with liquid therefrom, a liquid containing closed system, the liquid therein being separately maintained from that in the cable, an element in the system which is exposed to the differential effects of the pressures of the liquids in the vessel and in the closed system, the pressure of the liquid in the vessel changing with changes of pressure within the cable and that in the closed system with changes due to climatic conditions, expansible and contractible means responsive to changes of pressure of the liquid in the closed system, and a circuit controlling means actuated by the element.

2. A cable system comprising a cable filled with liquid under pressure, a vessel in free communication with the cable and filled with liquid therefrom, a liquid containing closed system, the liquid therein being separately maintained from that in the cable, an element in the system which is exposed to the differential effects of the pressures of the liquids in the vessel and in the closed system, the pressure of the liquid in the vessel changing with changes of pressure within the cable and that in the closed system with changes due to climatic conditions, expansible and contractible means responsive to changes of pressure of the liquid in the closed system, a means responsive to change of temperature of the cable for modifying the action of the closed system, and a circuit controlling means actuated by the element.

3. An apparatus for the purpose described comprising, in combination with a cable containing a liquid dielectric, a sealed casing to which liquid from the cable has free access, the pressure of the liquid varying with the temperature of the cable, a pressure responsive device located within the casing and exposed to the effects of the liquid therein, a body of independent liquid separately maintained from that in the cable acting on the device to move it, the pressure of the independent liquid varying in response to changes of temperature due to climatic conditions, and a signal means actuated by movements of the pressure responsive device.

4. An apparatus for the purpose described comprising, in combination with a cable containing a liquid dielectric, a sealed casing to which liquid from the cable has free access, the pressure of the liquid varying with the temperature of the cable, a pressure responsive device located within the casing, a body of independent liquid separately maintained from that in the cable acting on the device to move it, the pressure of the independent liquid varying in response to changes of temperature due to climatic conditions, a yieldable element acted upon by the body of liquid in response to variations in the pressure thereof, and an electrical contact actuated by movements of the pressure responsive device.

5. An apparatus for the purpose described comprising, in combination with a cable containing a liquid dielectric, a sealed casing to which liquid from the cable has free access, the pressure of the liquid varying with the temperature of the cable, a bellows diaphragm submerged in the liquid in the casing, a body of independent liquid separately maintained from that in the cable filling the diaphragm, means whereby the volume of the independent liquid can be changed to adjust the operation of the bellows, and an electrical contact means actuated by movements of the diaphragm.

6. An apparatus for the purpose described comprising, in combination with a cable containing liquid dielectric, a chambered casing connected to the cable and receiving liquid therefrom under varying pressure, a sealed element containing a body of independent liquid separately maintained from that in the cable, gas filled cells submerged in the body of liquid which expand and contract with variations of pressure of the body of the independent liquid, means for changing the amount of independent liquid to vary the action of the cells and a circuit controlling electrical contact responsive to movements of the sealed element.

7. An apparatus for the purpose described comprising, in combination with a cable containing liquid dielectric, a casing connected to the cable into and from which the liquid is free to flow, a bellows diaphragm located within the casing and submerged in the liquid from the cable, a body of independent liquid separate from that in the cable filling the diaphragm chamber, the liquid exerting a predetermined initial pressure thereon opposing the action of the cable liquid in which the diaphragm is submerged, a means through which the amount of the independent liquid body may be changed to regulate the action of the diaphragm, and a circuit controlling contact actuated by the diaphragm.

8. Apparatus for the purpose described comprising, in combination a cable containing liquid dielectric, a chambered casing into and from which liquid from the cable is free to flow, a bellows diaphragm located within the casing and submerged in the liquid from the cable, a second chambered casing, a yieldable element in the chamber thereof comprising a number of individual sealed cells each having elastic walls and a filling of gas, a body of liquid filling the bellows diaphragm and also the second chamber, which exerts an initial pressure on the walls of the diaphragm and on the walls of the cells, means for modifying the initial pressure in response to temperature changes of the cable, means whereby the quantity of liquid in the diaphragm and also in the second chamber can be changed to change the force exerted by the bellows diaphragm, and an electrical contact controlled by movements of the bellows diaphragm.

9. An apparatus for the purpose described comprising in combination with a cable containing liquid dielectric, a chambered casing into and from which cable liquid is free to flow, a bellows diaphragm located within the casing and submerged in the liquid from the cable, a second chambered casing, a yieldable element located in the chamber and acted upon by the liquid therein, a body of liquid separate from that of the cable filling both the diaphragm and the second chambered casing, a chambered means in good thermal communication with the cable covering containing the same kind of liquid that is contained in the second chamber and in free communication therewith, and an electrical contact controlled by the movements of the diaphragm.

LUIGI EMANUELI.